United States Patent Office 3,360,991
Patented Jan. 2, 1968

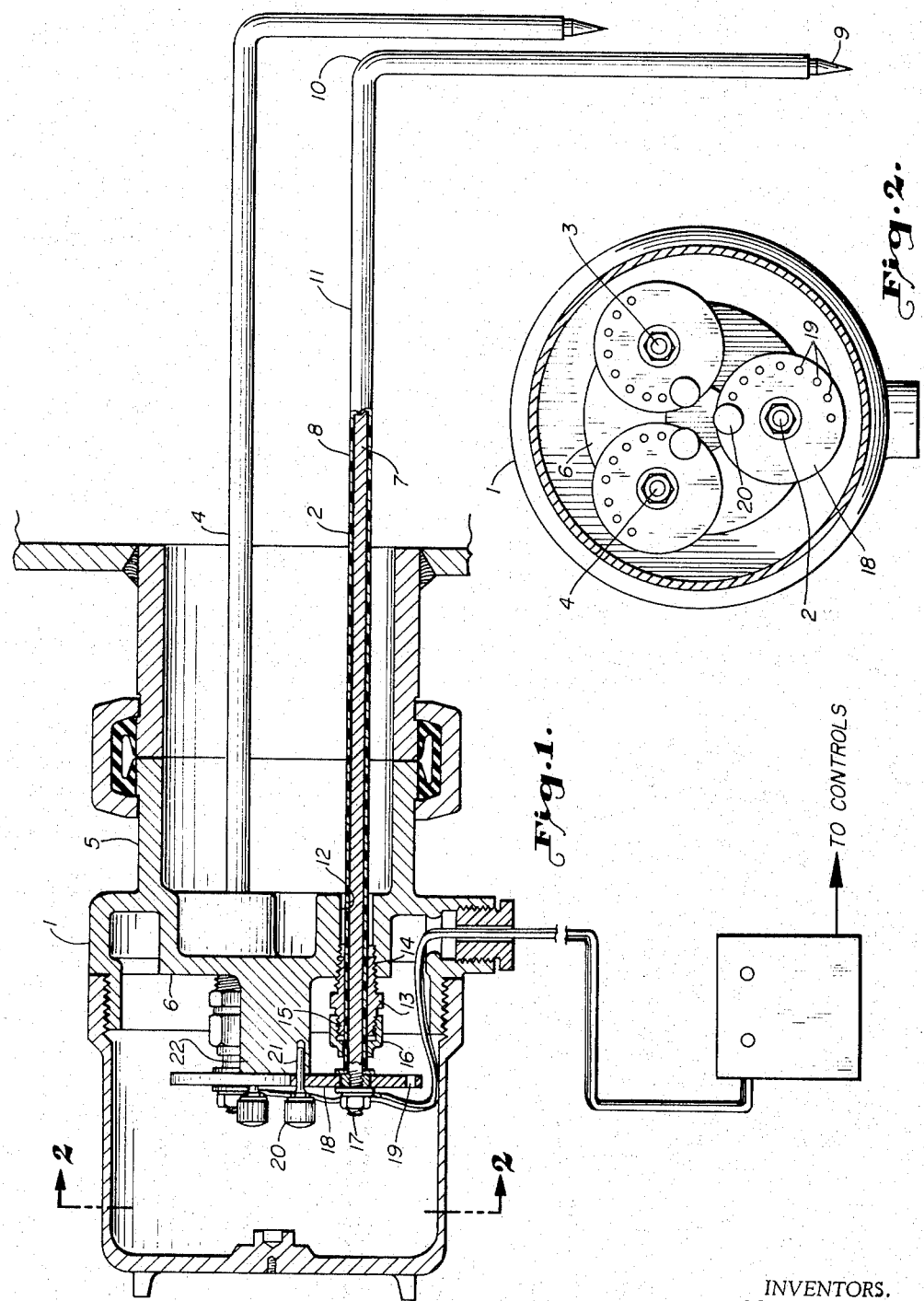

3,360,991
PRIMARY ELEMENT FOR LEVEL DETECTION
Maurice S. Hoss, Tulsa, Okla., and Joseph M. Green, Cody, Wyo., assignors to Combustion Engineering, Inc., New York, N.Y., a corporation of Delaware
Filed Mar. 7, 1966, Ser. No. 532,179
3 Claims. (Cl. 73—304)

The present invention relates to the support of an electrode as a primary element sensing the level of fluid material.

Elongated electrodes have been arranged to sense the presence of fluid levels by connection with electric circuits to manifest the location of these levels. A specific problem descends when an elongated electrode is extended parallel the fluid surface and the active end portion of the electrode is bent away from the horizontal axis of the electrode, toward the surface whose elevation is to be sensed. Rotation of the horizontal portion of the electrode will move the active end of the electrode through a vertical range. Indexing and fixing the height of the active end within the range presents the problem.

The principal object of the invention is to position the height of an electrode end and index and fix the height for detection of the level of fluid material.

The invention contemplates a housing with at least one elongated, horizontal electrode extended through a wall of the housing. The electrode is electrically insulated along its length except for its tip which is bent away from the axis of the electrode, generally toward the fluid surface to be sensed. A head structure is fixed to the housed end of the electrode with which to rotate the electrode. A structure is additionally provided for indexing and locking the head in position so the operator of the head may determine the height of the active end of the electrode and lock the height of the end within the range as desired.

Other objects, advantages and features of this invention will become apparent to one skilled in the art upon consideration of the written specification, appended claims, and attached drawings, wherein:

FIG. 1 is a partially sectioned side elevation of a support for electrodes in which the invention is embodied; and FIG. 2 is an end elevation of FIG. 1 to show how a number of electrodes are controlled on the common support.

In the drawings, FIG. 1 discloses housing 1 as the common support for a number of electrodes 2, 3 and 4. This housing 1 is fixed to a flange, or conduit, leading to the interior of a vessel not shown but containing a fluid with a surface to be detected. Flange 5 is the extension of housing 1 for this attachment. The electrodes 2, 3 and 4 are journalled through holes in wall 6 of the housing and extend through flange 5 and into the undisclosed container to which housing 1 is intended to be attached.

All the electrodes have the same form, so the structural relation between one of the electrodes and housing 1 is sufficient to disclose the basic relationship between the housing and each electrode. Electrode 2 is formed of an elongated metallic rod 7 having a sheath 8 of electrically insulating material extending from the housing 1 to near tip 9 of rod 7.

Electrode 2 is bent from its horizontal axis at 10, toward the surface of the fluid to be detected. Rotation of the portion 11, extending from housing 1, will swing tip 9 over a vertical range, normal to the surface to be detected. The present invention provides a means for this rotation and an index of this rotation within housing 1.

Electrode portion 11 extends through a hole 12 of housing 1. This end of electrode 2 specifically extends through a bushing 13 which is threaded into hole 12 by its end 14. The other end 15 of bushing 13 is threadedly engaged with a cap 16. The end of electrode 2 passes through cap 16 and tightening the threaded engagement of cap 16 and bushing 13 on the plastic sheath 8 effectively seals the fluid at this point. The seal will remain effective as electrode 2 is rotated in bushing 13.

On the housed end 17 of electrode 2 a disc 18 is mounted. Electrode end 17 is extended through a central hole of disc 18. Suitable washers and a nut fix the disc to this end 17. Manual rotation of disc will rotate electrode 2. Rotation of electrode 2 will place end 9 at the desired elevation within its range.

FIG. 2 discloses the disc 18 from 90° of the FIG. 1 view. In this end elevation, a number of holes 19 can be seen, arranged concentric to the center of the disc and near its edge. In FIG. 1, one of these holes 19 is shown with pin 20 extended therethrough and into hole 21 which is formed in index head 22 of housing 1.

Index head 22 is a boss formed on the wall 6 of housing 1. The holes 19 of disc 18 will successively align with hole 21 as disc 18 is rotated. Each alignment between hole 21 and holes 19 represents a known elevation of tip 9. Therefore, if pin 21 is placed through a selected one of holes 19 and into hole 21, tip 9 will be indexed and fixed at a predetermined height. When it is desired to change the elevation of tip 9, pin 20 is simply removed, disc 18 is rotated manually until the desired hole 19 is aligned with hole 21 and pin 20 inserted to maintain the indexed elevation.

All electrodes extending through wall 6 of housing 1 have discs which are indexed to holes in boss 22. This common relationship can be more readily seen in FIG. 2 where the index heads of electrodes 2, 3 and 4 can be observed, pinned to holes in boss 22 as desired.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A primary element for sensing fluid level, including,
   a housing member sealed in a wall of a fluid container,
   an elongated electrode extended through an aperture in a wall of the housing and sealed about the aperture, the end of the electrode extending away from the housing being formed at right angles to the axis of that portion of the electrode sealed to the housing,
   a head member fixed to the end of the electrode in the housing with which the electrode can be manually rotated to vary the vertical position of the other end of the electrode,
   and means for indexing the position to which the head member is rotated so the vertical position of the other end of the electrode can be fixed and determined by an operator at the housing.

2. The primary element of claim 1 in which,
   a sheath of insulating material is maintained about the electrode and extended to within a finite distance of its end,
   and the head member is in the form of a disc journalled over the housing end of the electrode with holes formed in an arc near the edge and a pin for entering through any hole and into a retaining hole on the housing.

3. The primary element of claim 1 in which a second electrode similar to the first is extended through a second aperture in the housing wall and indexed to provide a finite range for the detected level to be controlled in.

References Cited

FOREIGN PATENTS 634,722  1/1962  Canada.

LOUIS R. PRINCE, *Primary Examiner.*

D. O. WOODIEL, *Assistant Examiner.*